March 20, 1956  J. KORCHAN  2,738,984
COLLAPSIBLE SHOPPING CART
Filed April 9, 1952  2 Sheets-Sheet 1
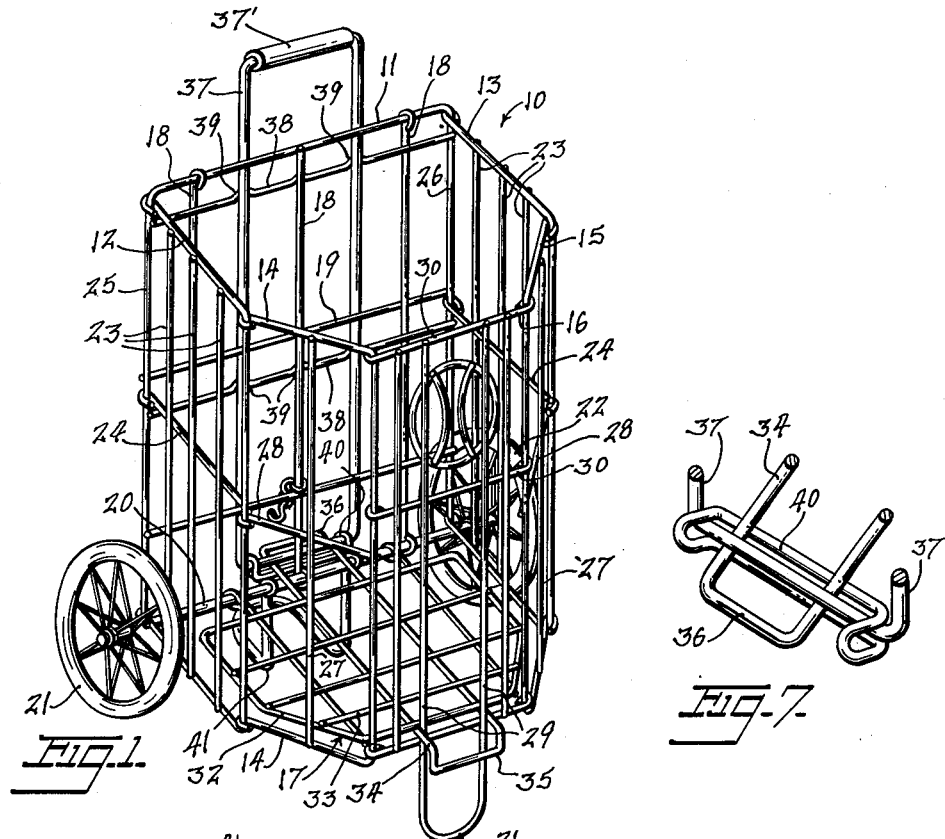
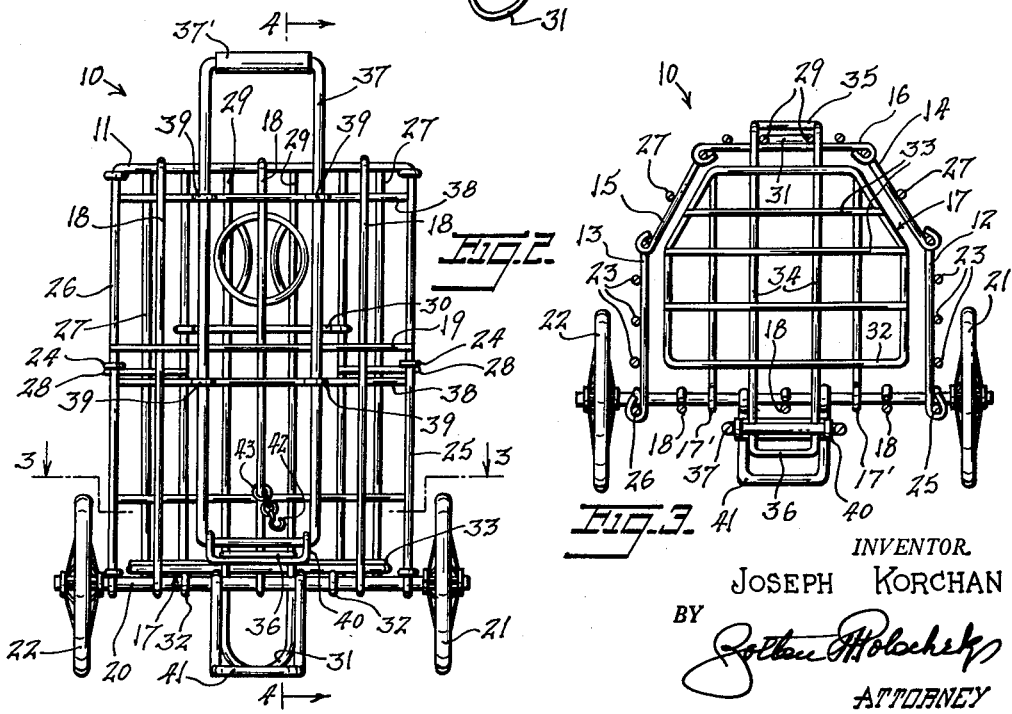
INVENTOR.
JOSEPH KORCHAN
BY
ATTORNEY March 20, 1956     J. KORCHAN     2,738,984
COLLAPSIBLE SHOPPING CART
Filed April 9, 1952     2 Sheets-Sheet 2
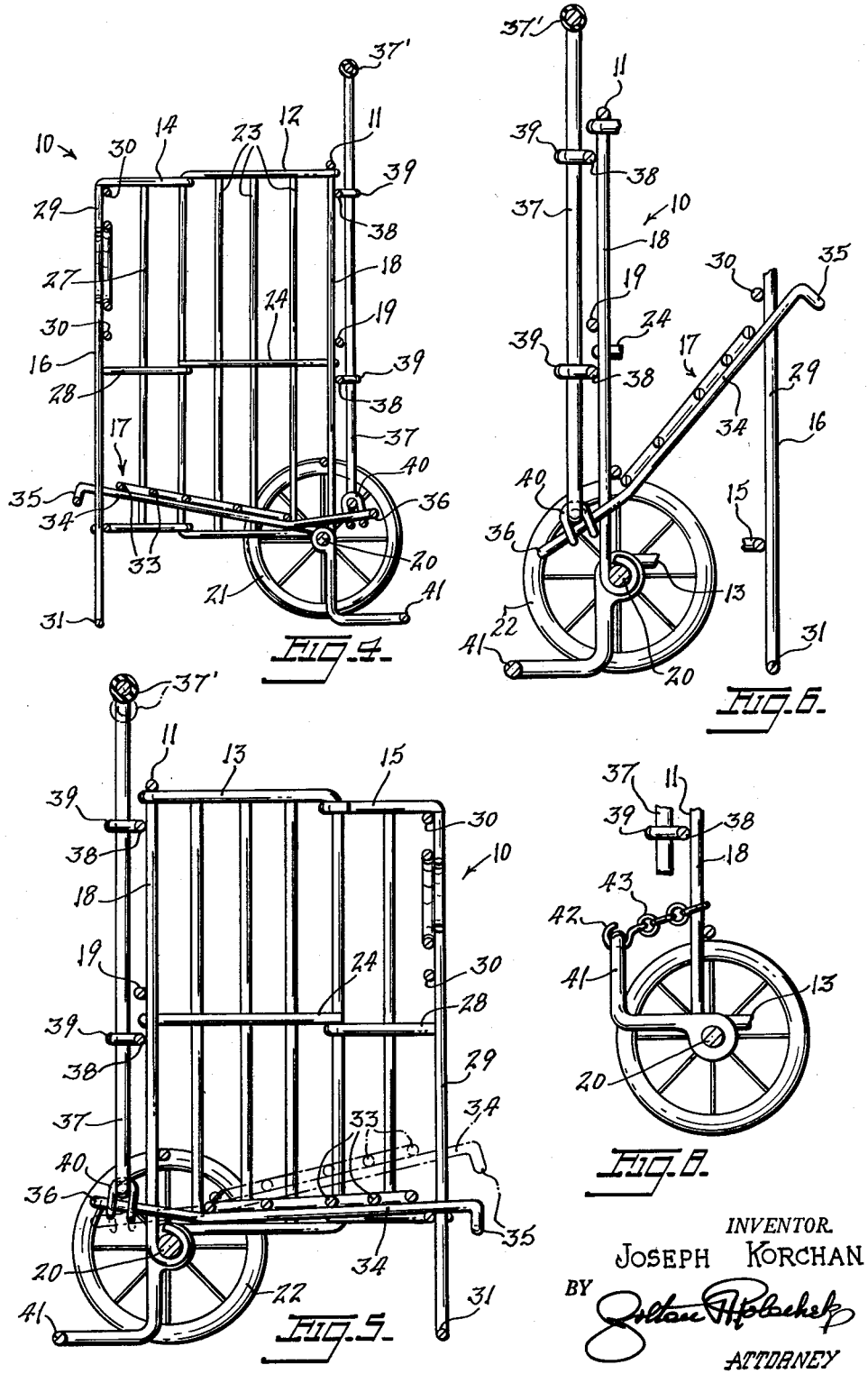
INVENTOR.
JOSEPH KORCHAN

United States Patent Office 2,738,984
Patented Mar. 20, 1956

2,738,984

COLLAPSIBLE SHOPPING CART

Joseph Korchan, New York, N. Y., assignor to Paul Korchan, New York, N. Y.

Application April 9, 1952, Serial No. 281,390

4 Claims. (Cl. 280—36)

This invention relates to new and useful improvements in a collapsible shopping cart.

More particularly, the present invention proposes the construction of an improved collapsible shopping cart which can be opened or closed with one hand merely by pulling or pushing the cart handle up or down so that articles in the other hand of a shopper can immediately be put into the cart without the necessity of the shopper first putting these bundles down, opening the cart, and then picking them up and putting them in.

Another object of the invention proposes forming the shopping cart with a foot rest member at the rear of the cart to make operation of the handle easier and to steady the cart further when it is open and resting upright.

Still further, the present invention proposes pivotally connecting the foot rest at the rear of the cart so that it may be folded up against the back section of the cart when not in use.

As a further object, the present invention proposes arranging the cart handle and slidably connecting it with the back section so that it may easily lift the bottom of the shopping cart and fold it up against the back section of the cart.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view illustrating the collapsible shopping cart of the present invention.

Fig. 2 is a rear view of the cart as shown in Fig. 1.

Fig. 3 is a sectional view taken on line 3—3 of Fig. 2.

Fig. 4 is a sectional view taken on line 4—4 of Fig. 2.

Fig. 5 is a fragmentary vertical sectional view showing the bottom section in open position and showing in dot-dash lines the initial movement of the bottom member by the handle to collapse the cart.

Fig. 6 is a view similar to Fig. 5 showing a further stage in the collapsing process.

Fig. 7 is a fragmentary perspective view showing a detail of construction at the lower end of the handle.

Fig. 8 is similar view showing the foldable foot rest secured in its inoperative position.

Referring more particularly to the drawings, the collapsible shopping cart 10 shown in the several figures is generally comprised of six wire frames or sections, 11 through 16, inclusive, hinged together and a wire bottom frame or section 17.

The back section 11 is in the shape of an inverted U having lengthwise wires 18 and cross-wise ones 19 welded together. The lower end of the back section is welded to an axle 20 on the ends of which wheels 21 and 22 are rotatably held.

Side sections 12 and 13 in the shape of an inverted block letter C and having lengthwise wires 23 and crosswise wires 24 welded together are hinged at their rear edges to the side edges 25 and 26 of the back section 11.

As shown in the drawings, this may be done by simply bending the adjacent free ends of the wires of the side section around the side edge wires 25 and 26 of the back section 11.

Similar shaped front sub-sections 14 and 15 having lengthwise wires 27 and crosswise wires 28 welded together are hinged at their rear edges to the side sections 12 and 13, the free ends of the front sub-section wires adjacent the forward side edges of the side sections being bent or hooked around these forward side edges.

Front center section 16 having lengthwise wires 29 welded to cross wires 30 is hinged to the forward side edges of the front sub-sections 12 and 13. The ends of cross wires 30 of the front center section 16 are bent around the forward side edges of the front sub-sections. The lengthwise wires 29 extend below the lowermost of the cross wires 30 to provide a front rest 31 for the cart when the cart is open and in rest position. (See Figs. 1 and 4).

Bottom section 17 has an outer edge wire 32 bent to conform generally to the opening formed when the side sections, the front sub-sections and the front center section are in their fully opened position as best shown in Fig. 3 and lengthwise wires 17′. The free ends of the wires 17′ are bent around the axle 20 to hinge the bottom section 17 at its rear end to the axle. Cross bars 33 are welded to the wires 17′ and the outer edge wire 32 in the bottom section. A closed, rectangular shaped, wire member 34 is welded to the cross bars 33 across their center portions and the front end of this member 34 extends beyond and encircles the lengthwise wires 29 of the front center section 16. The front end of member 34 is also downwardly bent, as at 35, and slidably secures the bottom section 17 to the front center section 16.

The rear end of the wire member 34 is bent upwardly slightly away from the plane of the bottom member and extends over the axle 20 and beyond the rear of the back section 11 to form a lever arm 36 fixed to the rear edge of the bottom section and extending rearwardly of the back section to pivot the bottom section on the axle as best can be seen in Figs. 4 to 6.

A cart handle 37, made of heavier gage wire than that in the sections, is slidably secured to the back section 11. The handle abuts the rear face of the back section and is slidably held to it by retainer cross wires 38 welded to the back section 11 and having rearwardly extending loop portions 39 through which the handle can slide.

Cart handle 37 preferably is U-shaped with the upper ends bent over and secured to a handle grip 37′. The lower closed end of the handle is aligned with and secured to the lever arm 36 of wire member 34 of the bottom section 17 by a wire clamp 40. The wire clamp 40 passes over the lower end of the handle and under the lever arm 36. Preferably the lower end of the handle is spaced from the lever arm to permit lost motion in the handle for striking the lever arm and making easier rotation of the lever arm.

A foldable foot rest 41 is provided at the rear of the cart. Foot rest 41 preferably is a U-shaped heavy wire having its lower closed end bent at right angles to its upper end. The free upper ends of the foot rest wire are bent around the axle to hinge the foot rest to the axle and make it foldable against the back section. An S hook 42, chained to the back section 11 by a short chain 43 provides means to hold the foot rest against the back section when it is not in use and to permit the cart to be freely wheeled.

To open cart 10, a shopper need only step on the foot rest 41 and pull up on the handle. This will pivot the bottom member into place, the bottom member opening the side and front sections in doing so, gravity facilitating the operation. The foot rest 41 will provide an additional support when the cart is resting on its wheels and the front rest 31. It will swing rearwardly enough to permit the cart to be wheeled about a store or shop and can be chained up for longer journeys if desired.

To collapse the cart, the shopper only has to push directly down on the handle when the cart is empty. Articles in the cart prevent any inadvertent collapse when the cart is not empty. The lost motion in the handle and the front end of member 34 on the bottom section extending beyond the lengthwise wires 29 of front center section 16 permits the bottom section to be raised to the extent shown in Fig. 4 and in dotted line in Fig. 5 before the side sections and front subsections are folded. This permits the bottom section to get into motion before it begins its collapsing task.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A collapsible shopping cart comprising a back section, an axle fixed to the back section at its lower end, wheels rotatably held on the ends of the axle, side sections hinged at their rear edges to the side edges of the back section, front sub-sections hinged at their rear edges to the side sections, a front center section hinged to the back section, front sub-sections hinged at their rear forward side edges of the sub-sections, and a bottom section hinged at its rear end to the axle, said bottom section having its front end slidably secured to the front center section, a lever arm fixed to the rear end of the bottom section and extending rearwardly of the back section to pivot the bottom section on the axle, a U-shaped cart handle slidably secured to the back section, said handle having the cross piece of its lower end aligned with and operatively connected to the lever arm for raising and lowering the bottom section and collapsing and opening the shopping cart, said lower end of the handle being secured to the lever arm by a removable looped wire clamp passing over the lower handle end and under the lever arm, said clamp loosely connecting the handle end and lever arm to permit lost motion in the handle for striking the lever arm and to permit rotation of the lever arm on the handle end.

2. A collapsible shopping cart comprising a back section, an axle fixed to the back section at its lower end, wheels rotatably held on the ends of the axle, side sections hinged at their rear edges to the side edges of the back section, front sub-sections hinged at their rear edges to the side sections, a front center section hinged to the forward side edges of the sub-sections, and a bottom section hinged at its rear end to the axle, said bottom section having its front end slidably secured to the front center section, a lever arm fixed to the rear end of the bottom section and extending rearwardly of the back section to pivot the bottom section on the axle, a U-shaped cart handle slidably secured to the back section, said handle having the cross piece of its lower end aligned with and operatively connected to the lever arm for raising and lowering the bottom section and collapsing and opening the shopping cart, said lower end of the handle being secured to the lever arm by a removable looped wire clamp passing over the lower handle end and under the lever arm, said clamp loosely connecting the handle end and lever arm to permit lost motion in the handle for striking the lever arm and to permit rotation of the lever arm on the handle end, a U-shaped foot rest hinged to and dependent from the axle and foldable up against the back section, and means to hold the foot rest against the back section when it is not in use.

3. A collapsible shopping cart comprising a back section, an axle fixed to the back section at its lower end, wheels rotatably held on the ends of the axle, side sections hinged at their rear edges to the side edges of the back section, front sub-sections hinged at their rear edges to the side sections, a front center section hinged to the forward side edges of the sub-sections, and a bottom section hinged at its rear end to the axle, said bottom section having its front end slidably secured to the front center section, a lever arm fixed to the rear end of the bottom section and extending rearwardly of the back section to pivot the bottom section on the axle, a U-shaped cart handle slidably secured to the back section, said handle having the cross piece of its lower end aligned with and operatively connected to the lever arm for raising and lowering the bottom section and collapsing and opening the shopping cart, a front rest member dependent from the lower edge of the front center section and a U-shaped rear foot rest hinged to and dependent from the axle.

4. A collapsible shopping cart comprising a back section, an axle fixed to the back section at its lower end, wheels rotatably held on the ends of the axle, side sections hinged at their rear edges to the side edges of the back section, front sub-sections hinged at their rear edges to the side sections, a front center section hinged to the forward side edges of the sub-sections, and a bottom section hinged at its rear end to the axle, said bottom section having its front end slidably secured to the front center section, a lever arm fixed to the rear end of the bottom section and extending rearwardly of the back section to pivot the bottom section on the axle, a U-shaped cart handle slidably secured to the back section, said handle having the cross piece of its lower end aligned with and operatively connected to the lever arm for raising and lowering the bottom section and collapsing and opening the shopping cart, a front rest member dependent from the lower edge of the front center section and a U-shaped rear foot rest hinged to and dependent from the axle, said rear foot rest being foldable up against the back section and a hook on the back section to hold the foot rest against the back section when it is not in use.

References Cited in the file of this patent
UNITED STATES PATENTS

| | | |
|---|---|---|
| 2,406,183 | Allen | Aug. 20, 1946 |
| 2,475,797 | Martin | July 12, 1949 |
| 2,589,044 | Brodeck | Mar. 11, 1952 |
| 2,629,609 | Wilson | Feb. 24, 1953 |
| 2,711,327 | Stoll | June 21, 1955 |